Oct. 2, 1945.    R. P. SCHLENKER    2,386,067
ELASTIC FLUID TURBINE ARRANGEMENT
Filed April 15, 1944

Inventor:
Rudolf P. Schlenker,
by Harry E. Dunham
His Attorney.

Patented Oct. 2, 1945

2,386,067

UNITED STATES PATENT OFFICE 2,386,067

ELASTIC FLUID TURBINE ARRANGEMENT

Rudolf P. Schlenker, Lynnfield, Mass., assignor to General Electric Company, a corporation of New York Application April 15, 1944, Serial No. 531,236

4 Claims. (Cl. 137—158)

The present invention relates to elastic fluid turbine arrangements comprising an elastic fluid turbine having at least two pressure stages, an inlet conduit with valve means therein together with means for draining fluid leaking along the valve stem or stems of the valve means. In many instances it is desirable normally to drain such leakage fluid into a low pressure turbine stage in which its available energy may be utilized. Such arrangement, however, has the drawback that leakage fluid is also drained to the turbine with the valve in closed position, that is, when the turbine is out of operation in which case the leakage fluid may cause corrosion of turbine parts.

The object of my invention is to provide an improved construction of elastic fluid turbine arrangements of the type above specified whereby the aforementioned drawback is overcome.

This is accomplished in accordance with my invention by the provision of means whereby leakage passing along the valve stem is drained to different points in the closed and open positions respectively of the valve. For example, when the valve is open such leakage may be drained to a low pressure turbine stage and when the valve is closed the leakage may be drained to atmosphere.

For a better understanding of what I believe to be novel and my invention, attention is directed to the following description and the claims appended thereto in connection with the accompanying drawing.

Figure 1:
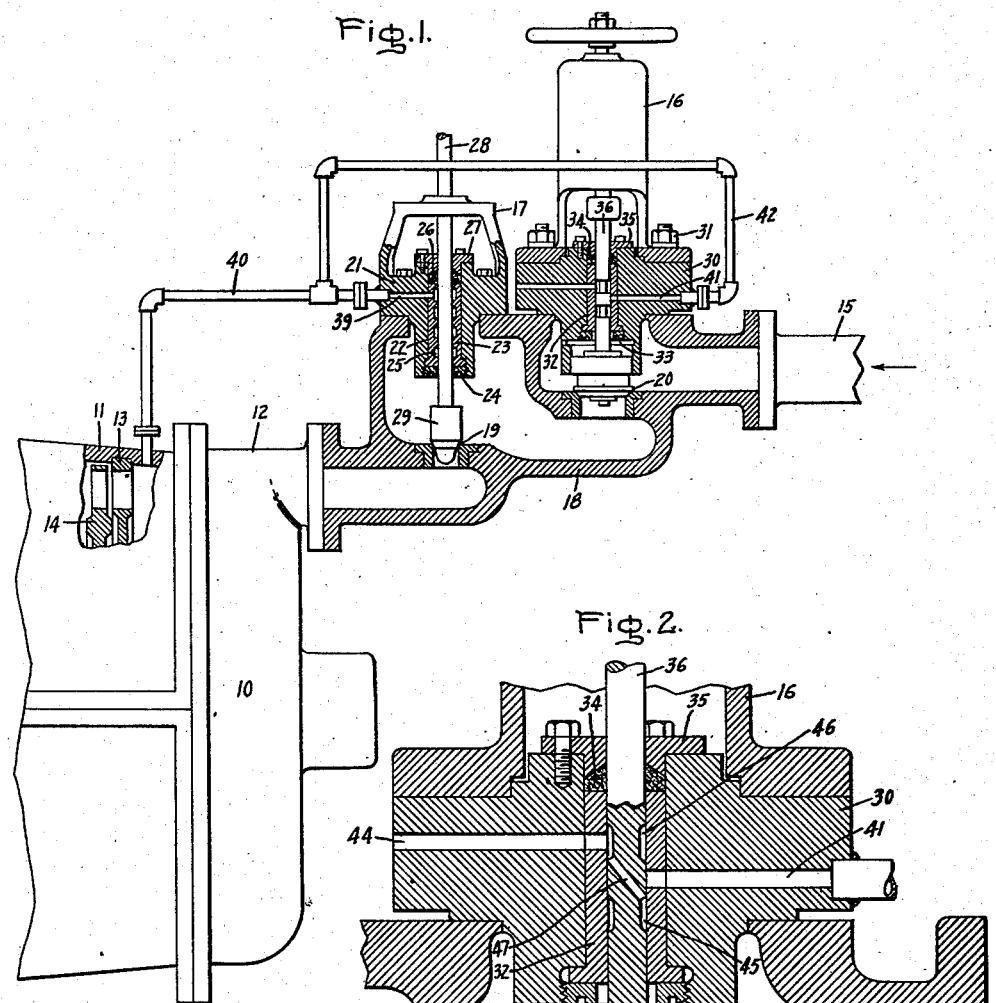
Figure 2:
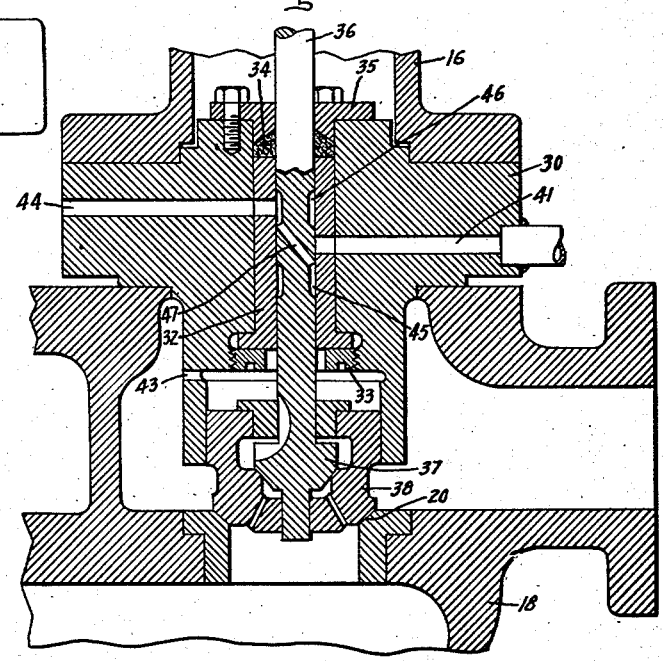
Figure 3:
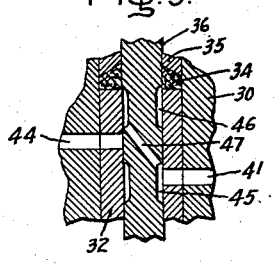

In the drawing, Fig. 1 illustrates an elastic fluid turbine arrangement embodying my invention; Fig. 2 is an enlarged detail view of a part of Fig. 1; and Fig. 3 illustrates a part of Fig. 2 in a different operating position.

The arrangement comprises an elastic fluid turbine 10 having a casing 11 containing a high pressure stage (not shown) upstream from the diaphragm 13 with an inlet 12. Fluid conducting and directing means including a low pressure diaphragm 13 are disposed within and supported on the casing for directing elastic fluid to bucket wheels including a low pressure bucket wheel 14 arranged to receive fluid from the diaphragm 13. The flanged inlet 12 of the casing is connected to an inlet conduit 15 which includes valve means for controlling the flow of fluid to the turbine. The valve means in the present example comprises a manually operated stop valve 16 and a control valve 17 which may be operated automatically by a speed governor or the like, not shown. The control valve 17 is located beyond the stop valve 16 as regards the direction of flow of fluid therethrough. In the present instance, the two valves have a common casing 18 with valve seats 19 and 20. The control valve 17 in addition includes a casing member or cover 21 with a bore 22. A sleeve 23 is inserted in the bore and held therein by a nut 24. The sleeve has a plurality of axially spaced grooves 25. A suitable packing 26 is disposed in the upper end of the casing member 21 and held therein by an end plate 27. A valve stem 28 has a sliding fit in the bore of the sleeve 22 at its lower end and carries a valve disk 29 for engaging the seat 19.

The stop valve 16 in addition to the casing 18 includes another casing member 30 secured to the casing 18 by bolts 31 and having a bore with a sleeve 32 securely held therein by a nut 33. A packing 34 is provided near the upper end of the bore and held in position by an end plate 35. A valve stem 36 is slidably disposed within the sleeve 32 and at its lower end carries a pilot valve member 37 and a main valve member 38.

The general construction of the valves so far described is well known in the art. During operation with high pressure, high temperature elastic fluid a substantial amount of fluid may leak along the valve stems. Such fluid during normal operation is drained from the valve casings and conducted to a low pressure turbine stage to be utilized therein. To this end I have provided the casing member 21 of the control valve with a leak-off channel 39 connected by a pipe 40 to the turbine casing ahead of the diaphragm 13. Similarly, the stop valve 16 is provided with a leak-off channel 41 connected by a pipe 42 to the aforementioned pipe 40. During operation both valves are in open position. Leakage of elastic fluid along the valve stems then is conducted from the channel 39 through the pipe 40 into the turbine casing and leakage along the stem 36 into the channel of the stop valve is conducted through the pipes 42 and 40 to the turbine.

When both valves are closed, fluid continues to leak from the inlet conduit 15 through an opening 43 in the casing member 30 of the stop valve and along the stem 36 thereof. Leakage of fluid may also occur along the cylindrical portion of the valve member 38. According to my invention means are provided whereby leakage along the valve stem in closed position of the stop valve is prevented from flowing to the turbine and is instead conducted to atmosphere or another suitable point. To this end the casing of the stop valve has in addition to the first drain channel 41 a second drain channel 44 located axially beyond the first drain channel 41. Also, as best shown in Fig. 2, the stem 36 of the stop valve has two axially spaced inner and outer annular grooves 45 and 46 respectively which are connected by an inclined channel 47 through the stem 36. With the valve in closed position, Fig. 2, the annular groove 46 registers with the second drain channel 44, whereas the other annular groove 45 is located below the inlet or port to the first drain channel 41. Thus, in closed position of the valve, fluid leaking along the stem 36 and reaching the annular groove 45 is conducted therefrom through the inclined channel 47 to the groove 46, whence the fluid is drained through the second channel 44 to atmosphere. In the open position of the valve, as shown in Fig. 3, however, the outer annular groove 46 is located above the second drain channel 44 and the inner groove 45 communicates directly with the first drain channel 41 so that leakage fluid passing along the valve stem is discharged through the latter to the turbine.

Broadly, a valve according to my invention has a casing with a bore and a valve stem 36 slidably projecting through the bore and having two axially spaced inner and outer annular grooves 45, 46 connected by a channel 47 through the stem 36. The casing has a first drain channel 41 and a second drain channel 44. The first drain channel 41 registers with the inner groove 45 of the stem in open valve position and the second drain channel 44 is arranged to register with the outer groove 46 of the valve stem in the closed valve position. With such arrangement leakage fluid is drained through the first drain channel in the open valve position and through the second drain channel in the closed valve position.

What I claim as new and desire to secure by Letters Patent of the United States, is:

1. Elastic fluid turbine arrangement including a multi-stage turbine having an inlet conduit, a stop valve and a control valve disposed in the inlet conduit with the control valve located beyond the stop valve as regards the direction of flow of fluid therethrough, each valve having a casing with a bore and a valve stem slidably projecting through the bore, means for draining fluid leaking along the valve stems from the valve casings during operation of the turbine and conducting such fluid to a low pressure stage of the turbine when the valves are open, and other means associated with the stop valve for draining fluid leaking from a high pressure region inside the valve casing along the stop valve stem to a region of lower pressure outside the turbine when the stop valve is closed and the turbine is not operating.

2. Elastic fluid turbine arrangement comprising a multi-stage turbine having an inlet conduit with a valve therein, said valve having a casing with a bore therethrough, a stem slidably projecting through the bore, and means for draining fluid leaking along the stem from the casing and conducting such leakage fluid to a low pressure turbine stage during normal operation of the turbine, and other means for rendering the first mentioned means inoperative when the valve is in closed position and for conducting leakage fluid to a point other than the turbine casing.

3. A valve comprising a casing having a bore, a valve stem slidably projecting through the bore, said stem having two axially spaced grooves and a passage connecting the grooves, and two drain channels in the casing, one of the drain channels communicating with said grooves and passage in closed valve position only and the other drain channel being arranged to communicate with the grooves and passage in open valve position only.

4. A valve comprising a casing having a bore and a valve stem slidably projecting through the bore, and means for draining fluid leaking along the stem in open position of the valve including a drain channel formed in the valve casing and other means for rendering the first named means inoperative in closed position of the valve including another drain channel formed in the casing and leading to a portion of the valve stem axially spaced from the first mentioned channel.

RUDOLF P. SCHLENKER.